July 2, 1968            K. E. KOLB            3,391,053
FLEXIBLE GLASS-PLASTIC LAMINATE
Filed Oct. 29, 1964
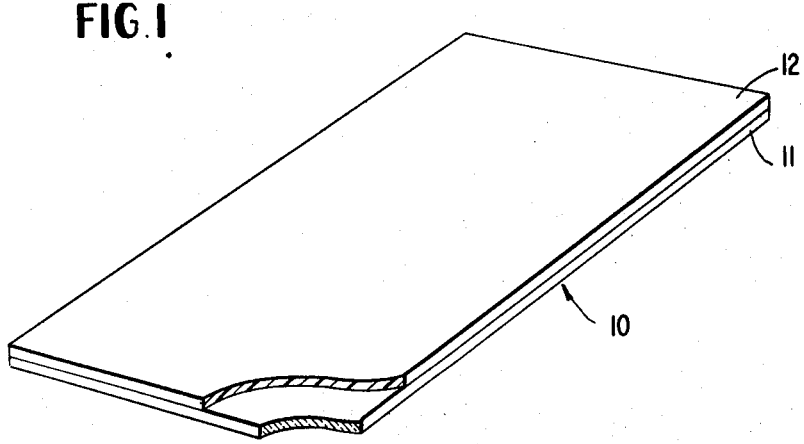
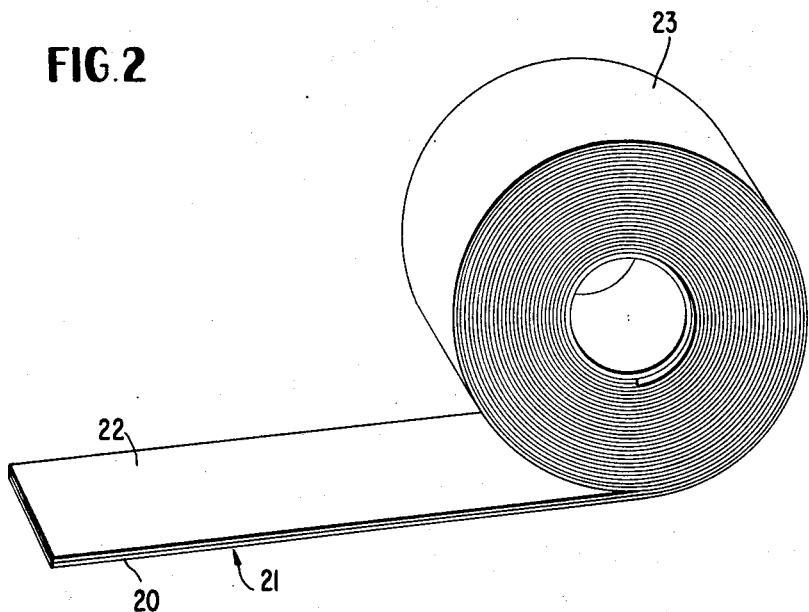
INVENTOR
KENNETH E. KOLB

United States Patent Office 3,391,053
Patented July 2, 1968

3,391,053
FLEXIBLE GLASS-PLASTIC LAMINATE
Kenneth E. Kolb, Corning, N.Y., assignor to Corning Glass Works, Corning, N.Y., a corporation of New York
Filed Oct. 29, 1964, Ser. No. 407,501
8 Claims. (Cl. 161—185)

ABSTRACT OF THE DISCLOSURE

A flexible glass-plastic laminate of a vapor impermeable glass sheet having a thickness of less than 0.01 inch bonded to a plastic layer having a percent elongation of at least 20 and a thickness of from 0.0005 to 0.02 inch formed from an epoxy resin or a polyurethane resin.

---

This invention relates to glass-plastic composites. More particularly, this invention relates to composites comprising thin glass substrates coated with epoxy or polyurethane resins.

A great deal of effort has been expended in attempting to develop a superior flexible insulating maerial. Properties sought in suitable material include high corona resistance, good flexibility and dimensional stability, and high mechanical strength.

At present, plastic materials, usually in the form of tapes, are widely used to insulate wires, cables and the like. Although satisfactory in some respects, plastic insulating tapes have certain defects which have prompted a search for substitutes. Among the drawbacks associated with plastic insulating tapes are low corona resistance, discoloration upon prolonged exposure to heat or light, and relatively high vapor permeability.

Another material which has been used as a flexible insulator is woven glass fabric. Although these fabrics have a high resistance to corona discharge, they are bulky and usually are vapor permeable. Thin glass tapes, although they have a high corona resistance, have not been widely used as flexible insulating materials because they are relatively breakable.

Accordingly, it is an object of this invention to provide a flexible, rugged and dimensionally stable glass-plastic composite article. A further object of the invention is to provide glass-plastic composites, especially glass-plastic insulating tapes, which have high corona discharge resistance and mechanical strength and which are vapor impermeable and resistant to discoloration upon exposure to heat or light.

In accordance with the invention, these and other objects are accomplished by coating a thin glass substrate with an epoxy or polyurethane resin. The plastic coating can be applied to the glass by brushing, roller-coating, dipping, spraying, or knife-coating. The preferred method of coating will vary with the type of plastic being applied and the speed of application required. The invention further contemplates a glass-plastic composite in which the plastic layer contains a coupling agent, thus forming a laminate which is highly resistant to peeling.

The invention will be more fully appreciated in the light of the following detailed description of the invention considered with reference to the accompanying drawing which illustrates certain preferred embodiments of the invention.

In the drawing:
FIGURE 1 is a perspective view of a composite glass-plastic sheet in accordance with the invention, and
FIGURE 2 is a perspective view of a roll of composite glass-plastic insulating tape in accordance with the invention.

The glass substrates which are used in the composite articles of this invention are extremely thin and flexible. The glass sheet should be of a thickness less than 0.01 inch. Preferably, the glass substrate will be as thin as possible, with glass having a thickness of 0.0001 inch being a realistic lower limit. Due to the current technical problems of forming glass sheets 0.0001 inch thick, a preferred thickness for commercial production will be in the range of from 0.0005 inch to 0.01 inch. The glass may be in the form of thin relatively narrow strips or tapes or may take the form of sheets of larger size, depending upon the end use of the composite.

Referring to the drawing, by way of illustration, it will be seen in FIG. 1 that the composite or laminate 10 may comprise a thin sheet of glass 11 bonded to a layer 12 of epoxy or polyurethane resin. As shown in FIG. 2, the composite 20 again comprises a thin layer of glass 21 bonded to a layer 22 of epoxy or polyurethane resin. In this instance, the laminate is in the form of a relatively narrow elongated tape or strip which may be wound into a spool or reel 23.

As shown in the drawings, the thin glass substrates 11 and 21 are preferably laminated or coated only on one surface with epoxy or polyurethane plastic layer 12 and 22 respectively. However, in certain instances, useful products may be obtained by laminating plastic layers to both surfaces of the thin glass substrate.

The plastic layer or coating of the composite is formed from an epoxy or polyurethane resin. As one function of the plastic layer is to increase the break resistance of the thin glass substrate, flexible epoxy or polyurethane resins having an elongation to the breaking point thereof of at least 20% are used. The thickness of the plastic layer is dependent in part on the glass thickness, with thinner plastic layers being used with thinner glasses. A practically useful range of plastic thickness is from about 0.0005 inch to 0.020 inch. The strength of the glass plastic composite is increased by increasing the flexibility and/or thickness of the plastic layer. For example, when a glass ribbon 0.0012 inch thick is coated with a layer of epoxy resin 0.0025 inch thick, the strength of the composite increases with an increase in the percent elongation of the plastic, as shown by Table I.

TABLE I

| Stress at breakage, p.s.i.×$10^3$: | Percent elongation of epoxy |
|---|---|
| 80 | 20 |
| 90 | 100 |
| 110 | 200 |
| 120 | 300 |

The ratio of glass to plastic thickness also affects the break resistance of the composite. For example, a 0.0012 inch thick glass sheet coated with a 0.006 inch thick layer of an epoxy resin having 125% elongation requires two and one-half times more force to penetrate with a sharp object, such as a nail, than does a similar piece of glass coated with a 0.002 inch thick epoxy layer.

Epoxy resins of sufficient flexibility to be useful in these composites are well known in the art and need not be described in detail here. These resins are generally formed by reacting epichlorohydrin with various polyglycols, such as glycerine. Commercially available resins include Epi-Rex 502, 5021, 5042 (Jones-Dabney) and Epon 812 and 872 (Shell Chemical Co.)

The epoxy resin employed does not have to be inherently flexible. Modifiers, such as organic polysulfides, can be added to non-flexible epoxy resins to render them sufficiently flexible for use, or to flexible epoxies to enhance their properties. An example of a suitable polysulfide modifier is Thiokol LP-3. In addition to or instead of employing these modifiers, a flexible curing agent can be used. Flexible curing agents include the polyamides derived from long chain fatty acids and amines, such as a diethylene triamine dilinoleic acid condensation product having an amine number of 210, and mixtures of dimer and trimer oleic acids, such as Emergy 3055–S. Of course, conventional curing agents can be used with epoxy resins which are rendered flexible by other means.

According to a preferred embodiment of the invention, a superior composite is obtained by adding a coupling agent to the plastic layer, especially when an epoxy resin composition is employed. This greatly increases the resistance to delamination of the epoxy coated glass article. A preferred coupling agent for incorporation in the epoxy layer is an amino functional silane having the formula:

Examples of other suitable coupling agents are as follows:

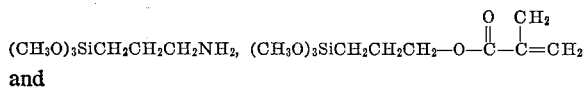

and

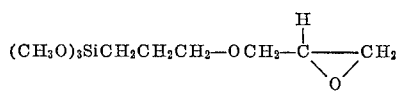

Only small amounts of the coupling agent need be added to the resin. When the agent is

amounts as small as 0.1% by weight will improve the glass-plastic adhesion. Preferably, the coupling agent will be added in an amount of from 0.1% to 1.0% by weight, with 5% by weight being a practical maximum.

In addition to epoxy resins, the coating material can be a flexible polyurethane type resin. A particularly good coating for the composite is formed by condensing a polyurethane material formed from a polyoxypropylene adduct of trimethylolpropane and toluene diisocyanate with polypropylene glycol. However, a wide variety of other flexible polyurethanes or polyurethanes which can be rendered flexible are also suitable.

Depending upon the use intended for the glass-plastic composite, the resin coating may be applied to one or both surfaces of the thin glass sheet.

The following examples will serve to illustrate certain preferred embodiments of this invention. All parts specified are by weight.

Example I

An epoxy coating composition is formed by mixing 375 parts of a bisphenol-A epichlorohydrin condensation product having an equivalent weight of 485 (Shell Chemical Company Epon 1001), 125 parts of a bisphenol-A epichlorohydrin condensation product having an equivalent weight of 950 (Shell Chemical Company Epon 1004) and a solvent mixture comprised of 70 parts of acetone, 70 parts of amyl acetate, 70 parts of ethoxy ethanol (Cellosolve) and 140 parts by weight of toluene. To this there is added 750 parts of a curing agent comprised of 150 parts of the polyamide of diethylene triamine and dilinoleic acid having an amine number of 210 and 500 parts of an ethyl butyl ketone solvent. A 0.006 inch thick coating is applied to a glass sheet 0.004 inch thick, by spraying the glass sheet on the draw as it was produced. After the sheet is coated in this manner, the solvent is evaporated and the coating is cured to a non-tacky state by heating for 30 seconds at 200° C.

The resulting composite article is flexible, rugged, and dimensionally stable. As it has a high corona resistance, it is an excellent insulating material. The presence of the epoxy coating renders the material relatively unbreakable. The epoxy coating adheres fairly well to the glass substrate and can be removed only after boiling in water for 10 minutes.

The delamination strength of the epoxy-glass composites is greatly improved by the addition of a small amount of a coupling agent as illustrated in the following example.

Example II

To an epoxy coating composition prepared in accordance with Example I there is added 3 parts by weight of an amino-functional silane having the following formula:

This coating is applied to a glass sheet 0.004 inch thick in a manner identical with that in Example I. A marked improvement in the delamination strength of the composite is provided since the epoxy coating tenaciously adheres to the glass substrate even after boiling in water for 45 minutes.

Example III

A polyurehane coating suitable for coating thin glass sheets to produce a flexible glass plastic composite is prepared by the addition with constant stirring of 822 parts of the polyoxypropylene adduct trimethylolpropane (mol. wt. 411, and hydroxyl content of 12.4 percent) to 844 parts of toluene diisocyanate (80% 2,4-isomer and 20% 2,5-isomer) under a nitrogen atmosphere. There is an immediate exothermic reaction. The temperature of the reaction mixture is kept below 50° C. by use of an ice bath. After the reaction subsides, 420 parts of polypropylene glycol having a molecular weight of 420 and a hydroxyl content of 8.10% is added to the reaction mixture. The temperature of the reaction mixture is maintained below 50° C. until the exothermic reaction subsides. The reaction mixture is then heated at 60° C. for 3 hours. Following this, it is diluted to a non-volatile content of 50% by adding a mixture of 1043 parts of butyl Cellosolve acetate and 1034 parts of xylene.

A coating of this polyurethane composition having a thickness of about 0.001 inch is applied to a glass ribbon having a thickness of 0.001 inch by dipping the glass in a bath of the resin followed by drying for about 5 minutes at 175° C. It is not necessary completely to cure the polyurethane by heating, since it continues to cure in the presence of atmospheric moisture.

The composite article formed above, i.e., thin ribbon glass coated on both surfaces with a 0.001 inch thick layer of polyurethane, is an excellent electrical insulator. It has a corona resistance twice that of a sheet of polyethylene terephthalate of the same thickness, i.e., about 0.003 inch. The product also has six times the room temperature electrical strength of high voltage insulation papers. Available insulating papers average about 450 volts/mil while the present thin ribbon glass-polyurethane composite averages about 2600 volts/mil.

Example IV

A coating composition is formed by adding 3.5 grams of diethylene triamine to a solution of 100 grams of an epoxy resin having an epoxide equivalent of amount 700 (Shell Chemical Company Epon 872) in 106 ml. of an equal volume mixture of xylene, methyl isobutyl ketone, and ethoxy ethanol (Cellosolve). 1 inch wide strips of 0.001 inch thick glass are drawn through the solution, air dried 5 minutes and then baked for 10 minutes at 150° C. The total epoxy coating thickness is 0.003 inch and the epoxy has a percent elongation of in excess of 100.

The composite is very rugged and if broken remains in one piece, being held together by the coating. A similar piece of glass, coated with an epoxy resin having a percent elongation of about 10 (Shell Chemical Company Epon 828) under similar conditions yields a rigid composite which is easily broken into many pieces.

The composite materials of this invention have a wide variety of uses. In tape form, they can be used as insulators or as armor for glass pipe. The composites can be coated with a metal oxide film or other electrically conducting or magnetic materials to provide a recording tape or the like having outstanding dimensional stability. Such tapes are also capable of being punched to provide a punched computer tape. Larger sheets of the glass-plastic composite can be used as insulating material in electrical transformers and in similar applications. Sheets of this thin plastic composite also can be used in numerous applications where low moisture vapor transfer is needed, such as in food packaging.

While the invention has been described with reference to certain preferred embodiments thereof, it will be understood that various changes and modifications may be made in the laminate described without departing from the spirit of the invention as set forth in the following claims.

What is claimed is:

1. A flexible glass-plastic laminate comprising a substantially vapor impermeable glass sheet substrate having a thickness of less than about 0.01 inch and a plastic layer bonded to at least one surface of said substrate, said plastic layer having a percent elongation of at least 20 and a thickness of from 0.0005 to 0.02 inch and being formed from a plastic selected from the group consisting of epoxy resins and polyurethane resins.

2. The laminate of claim 1 wherein said glass substrate has a thickness in the range of from about 0.0001 to 0.01 inch.

3. The laminate of claim 1 wherein said plastic layer is an epoxy resin cured with a flexible curing agent.

4. The laminate of claim 1 wherein said plastic layer is a polyurethane resin comprising the reaction product of a polyoxypropylene adduct of trimethylolpropane, toluene diisocyanate, and polypropylene glycol.

5. The laminate of claim 1, wherein said plastic is an epoxy resin containing an effective amount of a polysulfide flexibility modifier.

6. A flexible glass-plastic laminate comprising a substantially vapor impermeable glass sheet substrate having a thickness of from about 0.0001 to 0.01 inch and a plastic layer bonded to at least one surface of said substrate, said layer having a thickness of from about 0.005 to 0.02 inch and said layer comprising a mixture of 15 parts of a bisphenol-A epichlorohydrin condensation product having an equivalent weight of 485 and 5 parts of a second bisphenol-A epichlorohydrin condensation product having an equivalent weight of 950, and 6 parts of a curing agent consisting of the polyamide of diethylene triamine and dilinoleic acid with an amine number of 210.

7. The laminate of claim 6 wherein said plastic layer further comprises an effective amount of a coupling agent selected from the group consisting of

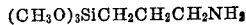
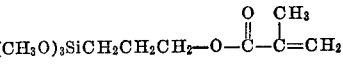

and

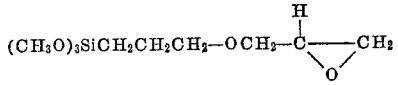

8. A flexible glass-plastic laminate comprising a substantially vapor impermeable glass sheet substrate having a thickness of from about 0.0001 to 0.01 inch and a plastic layer bonded to at least one surface of said substrate, said plastic layer having a thickness of from 0.0005 to 0.02 inch, said plastic layer comprising a polyurethane resin formed by reacting 822 parts of the polyoxypropylene adduct of trimethylolpropane having a molecular weight of 411 and a hydroxyl content of 12.4% with 844 parts of toluene diisocyanate, said toluene diisocyanate comprising 80% 2,4-isomer and 20% 2,6-isomer, and 420 parts of polypropylene glycol having a molecular weight of 420 and a hydroxyl content of 8.10%.

References Cited

UNITED STATES PATENTS

| | | | |
|---|---|---|---|
| 2,705,223 | 3/1955 | Renfrew et al. | 161—185 X |
| 2,740,743 | 4/1956 | Pace | 260—2.5 |
| 3,297,186 | 1/1967 | Wells | 161—185 X |
| 3,299,169 | 1/1967 | Smith | 161—185 X |

OTHER REFERENCES

Materials in Design Engineering, May 1961, vol. 53, No. 5, p. 17.

EARL M. BERGERT, *Primary Examiner.*

HAROLD ANSHER, *Examiner.*